United States Patent
Terada et al.

(10) Patent No.: US 7,587,941 B2
(45) Date of Patent: Sep. 15, 2009

(54) VIBRATION PIEZOELECTRIC ACCELERATION SENSOR

(75) Inventors: Jiro Terada, Osaka (JP); Masaya Nakatani, Hyogo (JP); Takami Ishida, Osaka (JP)

(73) Assignee: Panasonic Corporation, Osaka (JP)

( * ) Notice: Subject to any disclaimer, the term of this patent is extended or adjusted under 35 U.S.C. 154(b) by 381 days.

(21) Appl. No.: 10/585,618

(22) PCT Filed: Feb. 14, 2005

(86) PCT No.: PCT/JP2005/002126

§ 371 (c)(1),
(2), (4) Date: Jul. 11, 2006

(87) PCT Pub. No.: WO2005/085876

PCT Pub. Date: Sep. 15, 2005

(65) Prior Publication Data

US 2008/0223132 A1     Sep. 18, 2008

(30) Foreign Application Priority Data

Mar. 2, 2004   (JP) ............................. 2004-057203

(51) Int. Cl.
    *G01P 15/10* (2006.01)
(52) U.S. Cl. ................................. 73/514.29; 73/514.38
(58) Field of Classification Search ............. 73/514.29, 73/514.34, 514.38
    See application file for complete search history.

(56) References Cited

U.S. PATENT DOCUMENTS

| | | | | |
|---|---|---|---|---|
| 4,805,456 A | * | 2/1989 | Howe et al. | 73/514.18 |
| 5,367,217 A | * | 11/1994 | Norling | 310/370 |
| 5,487,305 A | * | 1/1996 | Ristic et al. | 73/514.32 |
| 5,780,742 A | * | 7/1998 | Burns et al. | 73/514.29 |
| 6,223,598 B1 | * | 5/2001 | Judy | 73/514.32 |

FOREIGN PATENT DOCUMENTS

| | | |
|---|---|---|
| JP | 2-248867 | 10/1990 |
| JP | 5-080075 | 3/1993 |
| JP | 5-288771 | 11/1993 |
| JP | 9-196965 | 7/1997 |
| JP | 9-211020 | 8/1997 |
| JP | 2000-205862 | 7/2000 |
| JP | 2000-206141 | 7/2000 |
| JP | 2002-243450 | 8/2002 |

* cited by examiner

*Primary Examiner*—John E Chapman
(74) *Attorney, Agent, or Firm*—Wenderoth, Lind & Ponack, L.L.P.

(57) ABSTRACT

A vibration piezoelectric acceleration sensor including a pair of beam shaped members linearly and oppositely disposed on a frame, a support body supporting the beam shaped member, and a holding part holding the support body moveably in a linear direction, and another pair of beam shaped members disposed linearly and oppositely crossing the pair of beam shaped members detecting acceleration in two axes, i.e. X and Y directions. The beam shaped members are extended and retracted by the acceleration transmitted to the support body through the holding part, changing a natural oscillation frequency. Accordingly, a high change ratio of resonance frequency can be provided with the detection of the acceleration, and the acceleration in the direction of two axes can be detected without being affected by a change in temperature.

20 Claims, 7 Drawing Sheets

VIBRATION PIEZOELECTRIC ACCELERATION SENSOR

This application is a U.S. national phase application of PCT International Application PCT/JP2005/002126

TECHNICAL FIELD

The present invention relates to a vibration piezoelectric acceleration sensor (hereinafter, called VAS) to be used for a posture controller, and a vehicle and other mobile equipment control system.

BACKGROUND ART

FIG. 7 is a cross sectional view of a conventional acceleration sensor. As shown in FIG. 7, diaphragm 2 is formed in a rear side of chip 1, and a plurality of distortion sensing resistors 3 are disposed on a surface side of the chip, (i.e., an opposing side of the diaphragm from the rear side). At another portion of the surface side of chip 1, a semiconductor integrated circuit for computing acceleration, and thin film resistor 4 for adjusting performance of the semiconductor integrated circuit are disposed. Protection film 5 is formed on the surface side covering at least thin film resistor 4 but not covering distortion sensing resistors 3. On the rear side of chip 1, glass weight 6 is attached.

When acceleration is applied to this conventional acceleration sensor, a stress is applied to weight 6. The sensor then detects the acceleration with a deformation of distortion sensing resistor 3. When two axes detection is required, two identical sensors are disposed crossing with each other at right angles. An example of this type of conventional acceleration sensor is disclosed in Japanese Patent Unexamined Publication No. H5-288771 (JP '771).

Another example of this type of conventional sensor is disclosed in Japanese Patent Unexamined Publication No. H5-80075 (JP '075). FIG. 8 is a block diagram showing an example of the acceleration sensor. As shown in FIG. 8, the sensor is composed of piezoelectric element 11 outputting a signal corresponding to acceleration G, impedance converter 12 converting the signal output from piezoelectric element 11, filter 13 filtering an unneeded signal from the signal output from impedance converter 12, amplifier 14 amplifying a needed signal output from filter 13, alternating signal output device 16 outputting an alternating signal synchronized with a synchronism of a timing signal input from an outside, and capacitor 17 connected in series between alternating signal output device 16 and piezoelectric element 11.

A voltage signal output from this conventional acceleration sensor is input to measuring/operating unit 18 and controller 15. When two axes detection is required, two identical sensors are disposed crossing with each other at right angles for detection.

In the acceleration sensor in JP '771, a several percent of change in resistance value can be identified with a semiconductor resistor distortion formula. However, in this device, accurate acceleration detection is difficult because the variance in the change of the resistance value is wide and signals are affected by a change in the temperature of the processing circuits.

With the device in JP '075, where the piezoelectric element is used for detecting displacement speed of the element, detecting of such as a component of static gravitational acceleration is difficult because of its detecting mechanism. Two sensors are required for two axes detection. Thus, cost increase and possible variation in performance exist.

SUMMARY OF THE INVENTION

This invention includes an element comprising a frame, a pair of beam shaped members linearly and oppositely disposed on the frame, an under part electrode which is successively stacked on the beam shaped member, a piezoelectric thin film, an upper part electrode, a support body supporting the beam shaped members at an adjacent one end of each beam shaped member, and a holding part holding the support body slidably in a linear direction, in which the beam shaped members are extended and retracted by an acceleration transmitted to the support body through the holding part of the element, and in which the acceleration is detected through a change in a natural oscillation frequency of the beam shaped member. A pair of beam shaped members are linearly and oppositely disposed crossing the pair of beam shaped members that is linearly and oppositely disposed on the frame, detecting the acceleration in two axes directions. With this arrangement, both static and dynamic acceleration can be detected along two axes directions without being affected by noise or other environmental change. Thus, a highly reliable vibration piezoelectric acceleration sensor which operates under severe temperature changing environment is provided.

REFERENCE MARKS IN THE DRAWINGS

Figure 1:
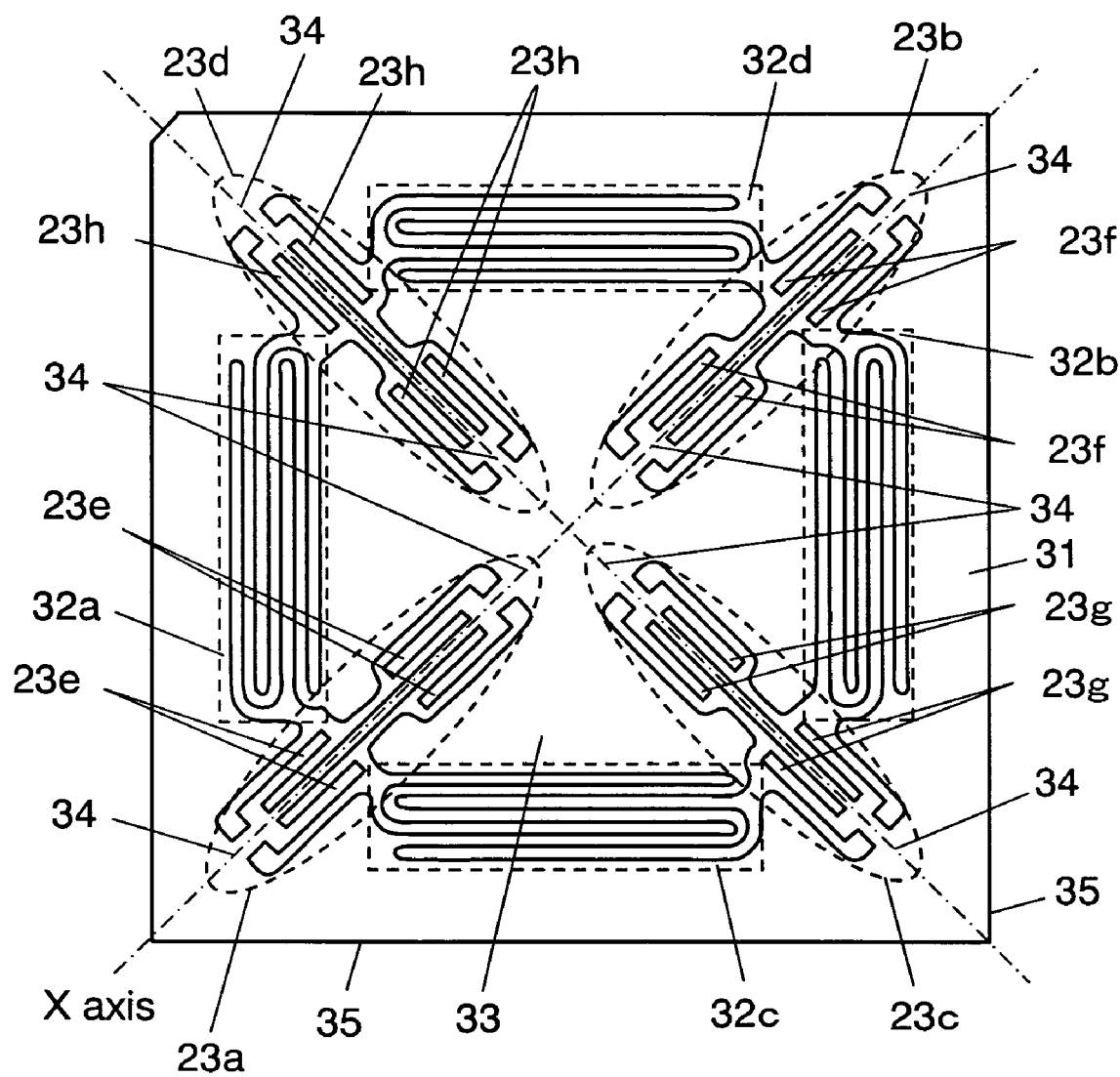
FIG. 1 is a plan view showing a structure of an element of a vibration piezoelectric acceleration sensor (VAS) in accordance with a first embodiment of the present invention.

20 Si layer
21 substrate
22 SiO$_2$ layer (etching stopper)
23 beam shaped member
23a, 23b, 23c, 23d beam shaped member
23e, 23f, 23g, 23h, 23i arm
24 under part electrode
25 piezoelectric thin film
26 upper part electrode
26a detecting electrode
26b driving electrode
27 resist
28 side ditch
29 hole
30 side hole
31 frame
32, 32a, 32b, 32c, 32d holding part
33 support body
34 basal part element of VAS
36a signal detecting line
36b signal driving line
38 amplifying circuit
39 F/V converter
40 AGC circuit
41 VAS device
41a, 41b, 41c, 41d VAS
42,43 differential circuit
44 vehicle body
45, 46 airbag
47 airbag opening device
48 driver
49 moving direction

DETAILED DESCRIPTION OF THE INVENTION

Following, embodiments are explained in detail with reference to the drawings. The drawings are schematic diagrams and they do not necessarily show correct dimensional relationships between the elements.

First Exemplary Embodiment

Figure 2:
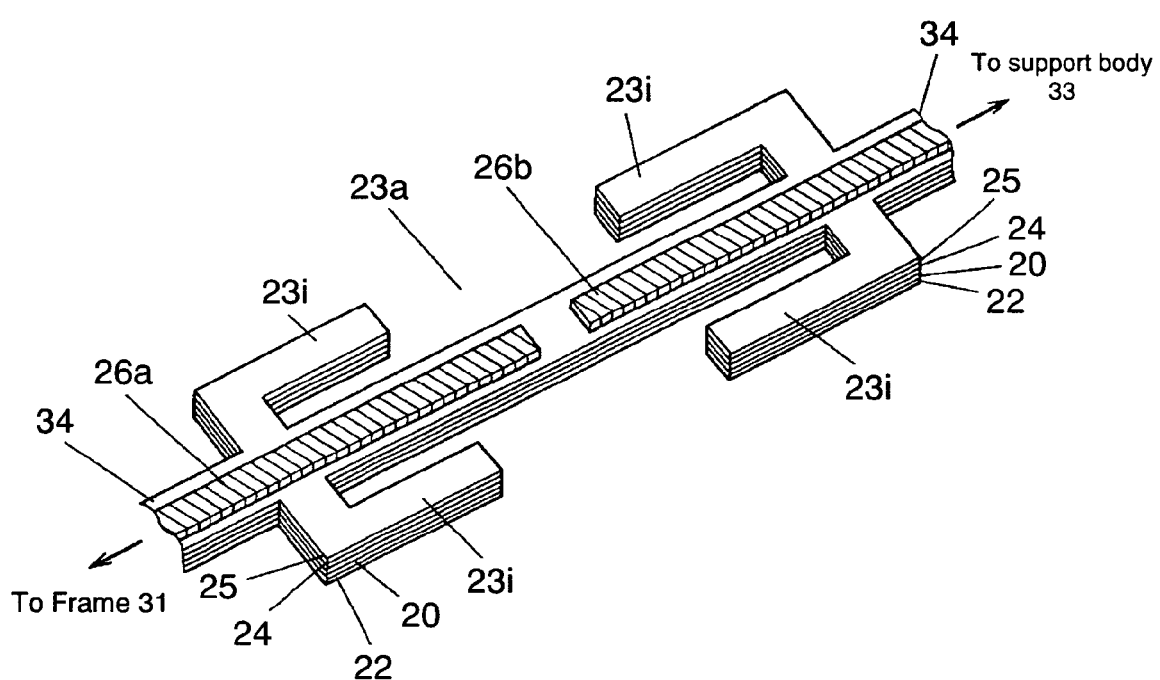
FIG. 2 is a perspective view showing a structure of a beam shaped member of the VAS in accordance with the first embodiment of the present invention.

As shown in FIGS. 1 and 2, beam shaped members 23a to 23d having a natural oscillation frequency are disposed in frame 31. Support body 33 changes the natural oscillation frequency of beam shaped members 23a to 23d. Holding parts 32a to 32d are formed in a meandering manner for holding the support body in a moveable manner and in a linear direction. In this embodiment, beam shaped members 23a to 23d extend and retract freely, therewith acceleration can be detected in a highly responsive and a highly accurate manner without being affected by a change in temperature.

Beam shaped member 23a is formed in a generally rectangular shape and has basal part 34 at each end of the beam shaped member, one basal part 34 being held by frame 31 and an other basal part 34 being held by support body 33. Support body 33 is held by frame 31 via holding part 32a formed in the meandering manner, thus moving back-and-forth in a linear direction. Here, only beam shaped member 23a disposed on frame 31 is explained, but the same principle is applied to other beam shaped members 23b to 23d, so further detailed explanation is omitted.

Arm 23i can be formed as extending from basal part 34. By forming arm 23i, sharpness of resonance frequency is increased by at least 2 to 3 times, and the increased resonance sharpness enhancing an accuracy of detection. Because a higher change ratio of resonance frequency can be obtained with acceleration, the acceleration can be detected highly accurately without being affected by a change in temperature.

Following, configuration of the beam shaped member is explained in detail taking beam shaped member 23a as an example in FIG. 2.

Beam shaped member 23a as illustrated in FIG. 2 is composed of Si layer 20 formed on SiO$_2$ layer 22, under part electrode 24 formed on Si layer 20, piezoelectric thin film 25 formed on under part electrode 24, and an upper part electrode formed on piezoelectric thin film 25. The upper part electrode is composed of driving electrode 26b and detecting electrode 26a. Driving electrode 26b and detecting electrode 26a are formed along a center part of the beam shaped member 23a, and the electrodes are extendedly formed onto support body 33 and frame 31. In this embodiment, a center portion of holding part 32a vibrates least, thus the displacement does not generate significant electromotive force, so that a modulation signal is scarcely interposed to the resonance frequency of beam shaped member 23a, thereby only the resonance frequency of beam shaped member 23a can be detected.

Furthermore, driving electrode 26b and detecting electrode 26a has a tapping electrode (not illustrated) at a predetermined part of the electrode extended to frame 31, and the tapping electrode is drawn to a control circuit (not illustrated). Since the tapping electrode is disposed on non-vibrating frame 31 without influencing vibration of beam shaped member 23a, acceleration can be detected highly accurately without being affected by a change in temperature.

Still furthermore, driving electrode 26b and detecting electrode 26a are disposed symmetrically with respect to a central axis that crosses a longitudinal direction of beam shaped member 23a and equally divides beam shaped member 23a. By dividing an effective area of beam shaped member 23a equally, detecting sensitivity through driving of beam shaped member 23a and detecting from beam shaped member 23a is maximized.

Next, the working principle of this vibration piezoelectric acceleration sensor (VAS) in accordance with the exemplary embodiment is explained. Drawings 3A to 3D show constitution of the VAS in accordance with the exemplary embodiment, and each drawing having corresponding beam shaped member 23a to 23d. Element having beam shaped member 23a as illustrated by FIG. 2 is shown by an equivalent circuit 35.

The VAS includes signal detecting line 36a, signal driving line 36b, amplifying circuit 38 for amplifying a weak signal and driving beam shaped member 23a of element 35, F/V converter 39 for converting a frequency of input signal into a voltage, and AGC circuit 40 for controlling a voltage level of output signal from amplifying circuit 38. Element 35 is attached to a main body (not illustrated) similarly to the main body holding element 35 with frame 31.

First, when electric power is input to VAS 41a, a signal including noise for amplification is input to amplifying circuit 38. The amplified signal is input through signal driving line 36b to driving electrode 26b of element 35, vibrating beam shaped member 23a. An electrical charge is excited at piezoelectric thin film 25 in beam shaped member 23a to detecting electrode 26a, which is input from detecting electrode 26a through signal detecting line 36a to amplifying circuit 38. This process in the closed loop is repeated until the signal is stabilized into a stationary state of resonance frequency of natural vibration. Then, the resonance frequency signal of natural vibration is input to F/V converter 39 and is converted to a predetermined voltage. AGC circuit 40 is operable when a voltage level that is output from amplifier 38 becomes too large to cause a distortion of the signal, namely the AGC circuit acts achieving an accurate F/V conversion without an error.

When acceleration is applied from an external source, an inertia force is applied from frame 31 to support body 33 held by holding part 32a, moving the support body in back and forth directions along a linear line. With this back and forth movement, beam shaped member 23a vibrating in a stationary state contracts and retracts changing the resonance frequency of natural vibration of beam shaped member 23a. Thus, the change in the resonance frequency of the natural vibration is detected, corresponding to the acceleration applied. In this embodiment, a higher change ratio of the resonance frequency can be obtained, namely acceleration can be detected highly accurately without being affected by a change in temperature.

Figure 3A:
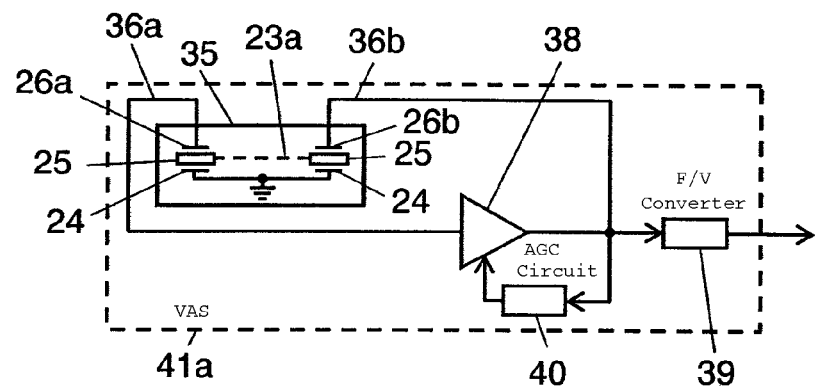
FIG. 3A is a drawing showing a constitution of a VAS in accordance with the first embodiment of the present invention.
Figure 3B:
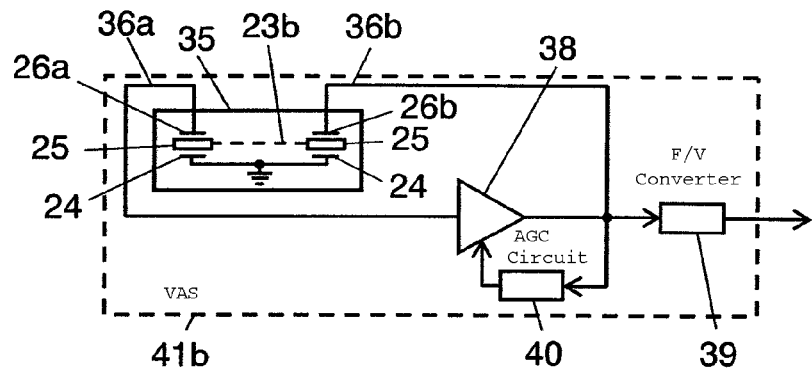
FIG. 3B is a drawing showing a constitution of a VAS in accordance with the first embodiment of the present invention.
Figure 3C:
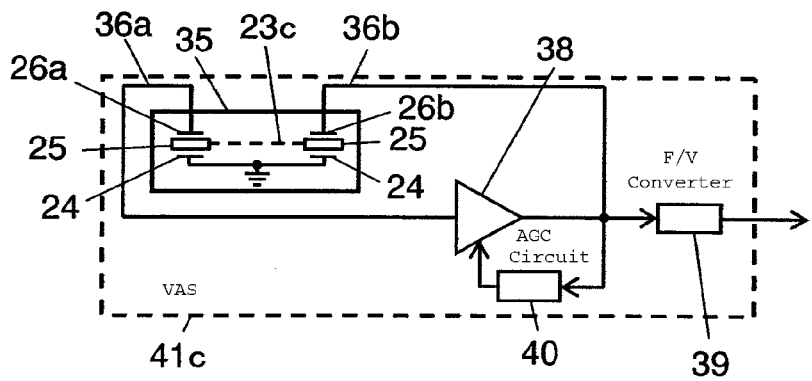
FIG. 3C is a drawing showing a constitution of a VAS in accordance with the first embodiment of the present invention.
Figure 3D:
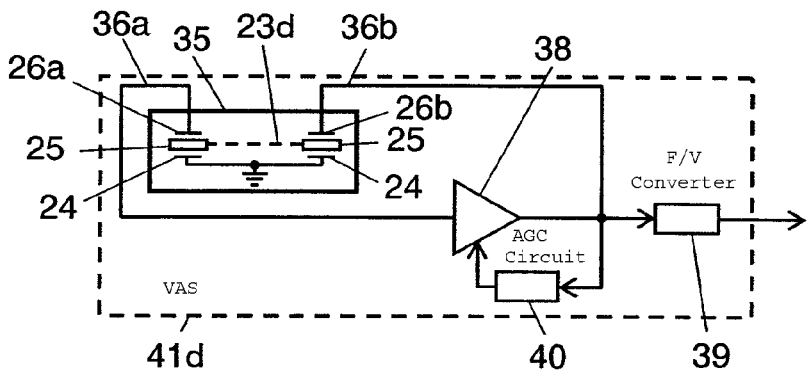
FIG. 3D is a drawing showing a constitution of a VAS in accordance with the first embodiment of the present invention.

In the above example, only beam shaped member 23a is explained. Since other beam shaped members 23b to 23d are corresponded to FIGS. 3B to 3D and their working mechanism is similar to 23a, explanation of them is omitted.

Figure 4:
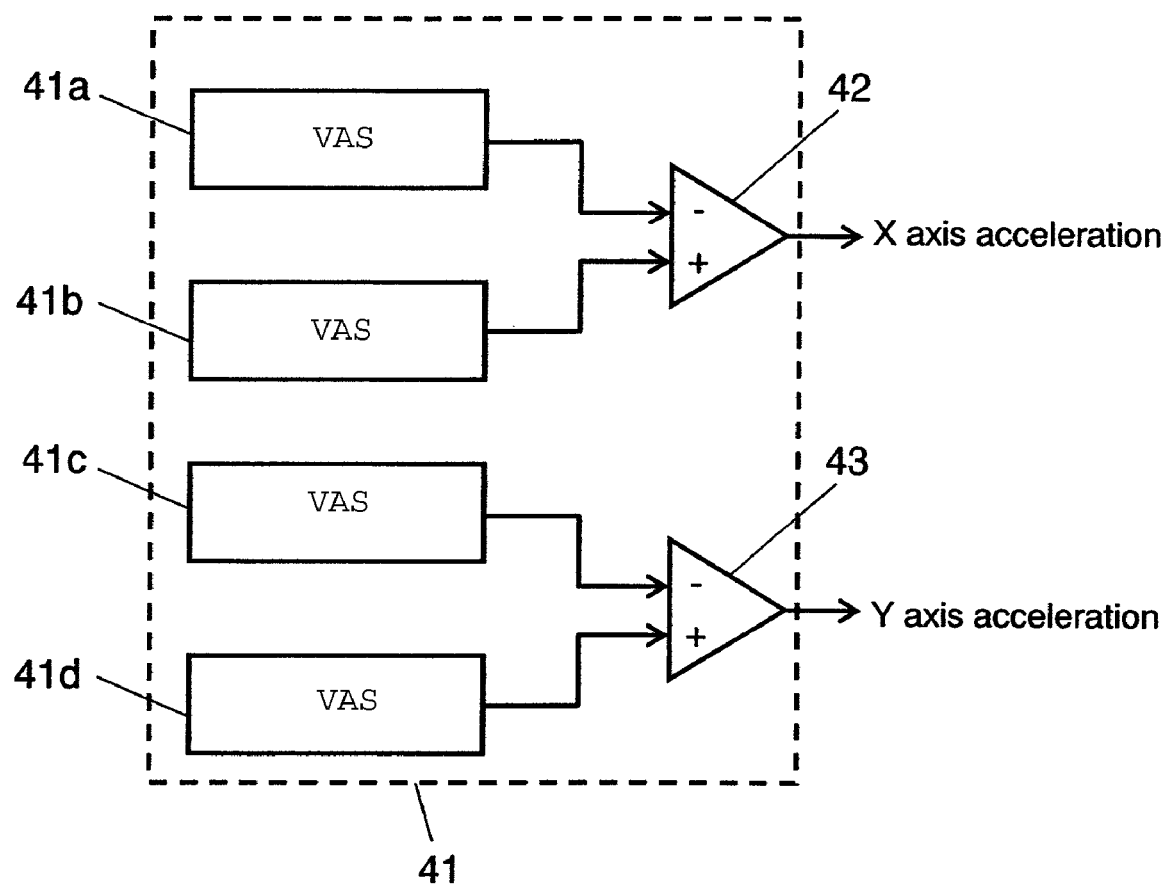
FIG. 4 is a circuit diagram showing a constitution of 2 axes detection of the VAS in accordance with the first embodiment of the present invention.

FIG. 4 shows an embodiment of a main body of VAS 41. It is a two axes detection system in which differential circuit 42 and 43 each obtaining a differential voltage as an output signal from VAS 41a to 41d, making them an acceleration detection signal of X-axis and Y-axis. Because differential circuits 42 and 43 differentially cancel out changes in performance of each element and circuit, further stabilization can be expected.

Following, the production method of the VAS in accordance with the exemplary embodiment is explained. FIGS. 5A to 5F are production process drawings showing a production method of the VAS in accordance with the exemplary embodiment, each illustrating cross sectional views of a center part of beam shaped member 23a.

Figure 5A:
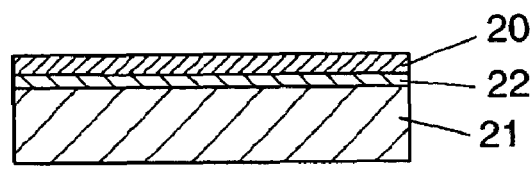
FIG. 5A is a production process drawing showing a production method of the VAS in accordance with the first embodiment of the present invention.

First, as illustrated in FIG. 5A, etching stopper 22 made of SiO$_2$ is formed on substrate 21, which is made of Si for stopping etching, then Si layer 20 is formed on etching stopper 22. The thickness of substrate 21 is 500 μm, etching stopper 22 is 2 μm, and Si layer 20 is 10 μm.

Figure 5B:
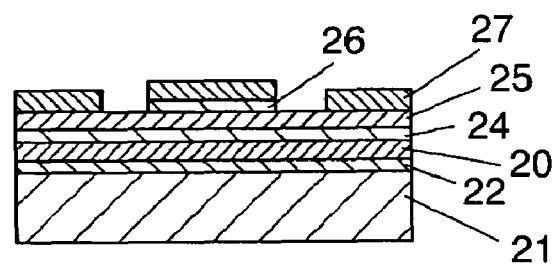
FIG. 5B is a production process drawing showing a production method of the VAS in accordance with the first embodiment of the present invention.

Following, Ti is formed in a thickness of 50 Å on Si layer 20 by high frequency sputtering, and then platinum in a thickness of 2000 Å is formed under part electrode 24, as illustrated in FIG. 5B. Next, piezoelectric film 25 made of PZT (Lead Zirconate Titanate) is formed in a thickness of 2 μm on the platinum, then Ti layer is formed in a thickness of 100 Å on piezoelectric film 25 by vapor deposition, using a metal mask for obtaining a desired pattern, and then similarly gold is formed in a thickness of 3000 Å on the Ti layer by vapor deposition, thus constituting upper part electrode 26 having a prescribed pattern. Next, resist 27 is formed on the gold, resist 27 serving as an etching mask. The reason for using PZT material is to obtain a higher conversion of resonance frequency changed by acceleration.

Figure 5C:
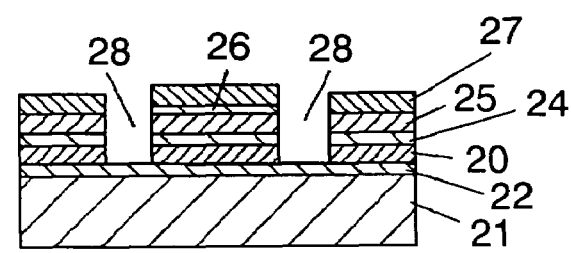
FIG. 5C is a production process drawing showing a production method of the VAS in accordance with the first embodiment of the present invention.

Next, side ditch 28 is formed shown in FIG. 5C. In addition to the above explained beam shaped member, support body 33 and holding part 32 can be made of Si, therewith the resonance frequency correspondingly changing with the stress of beam shaped member 23 caused by acceleration can be stably improved.

Figure 5D:
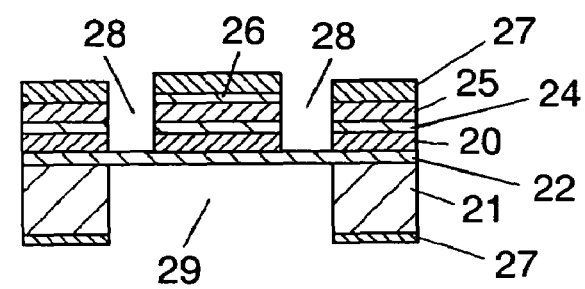
FIG. 5D is a production process drawing showing a production method of the VAS in accordance with the first embodiment of the present invention.

Next, as shown in FIG. 5D, resist 27 is formed in a predetermined pattern at a rear side of substrate 21, and then the rear side of substrate 21 is etched, forming hole 29.

Figure 5E:
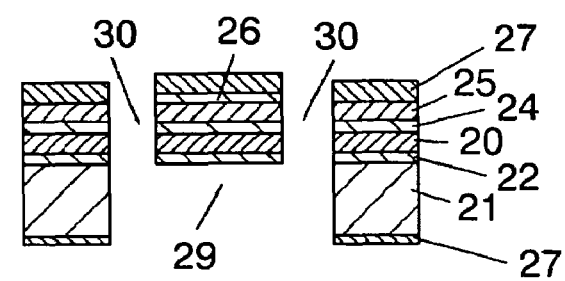
FIG. 5E is a production process drawing showing a production method of the VAS in accordance with the first embodiment of the present invention.
Figure 5F:
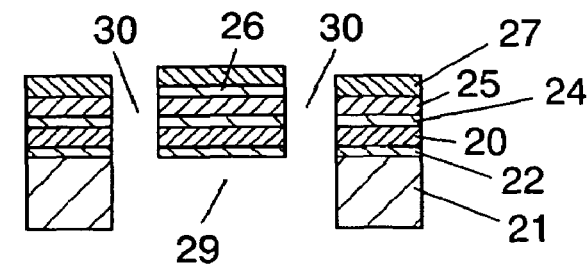
FIG. 5F shows a production process of the VAS illustrating its production process in accordance with the first embodiment of the present invention.

Next, as shown in FIG. 5E, the side of resist 27 is etched again, forming side hole 30. Then, resist 27 is removed at the rear side. Thus, beam shaped member 23 in a thin size and in a wedge shape is manufactured, as shown in FIG. 5F.

Detection sensitivity can be further improved by adding mass to an upper or a lower surface of support body 33. Increased mass of support body 33 strengthen the stress applied to beam shaped member 23a, increasing a degree of change in the resonance frequency caused by acceleration, thus raising the detecting sensitivity.

Second Exemplary Embodiment

Figure 6:
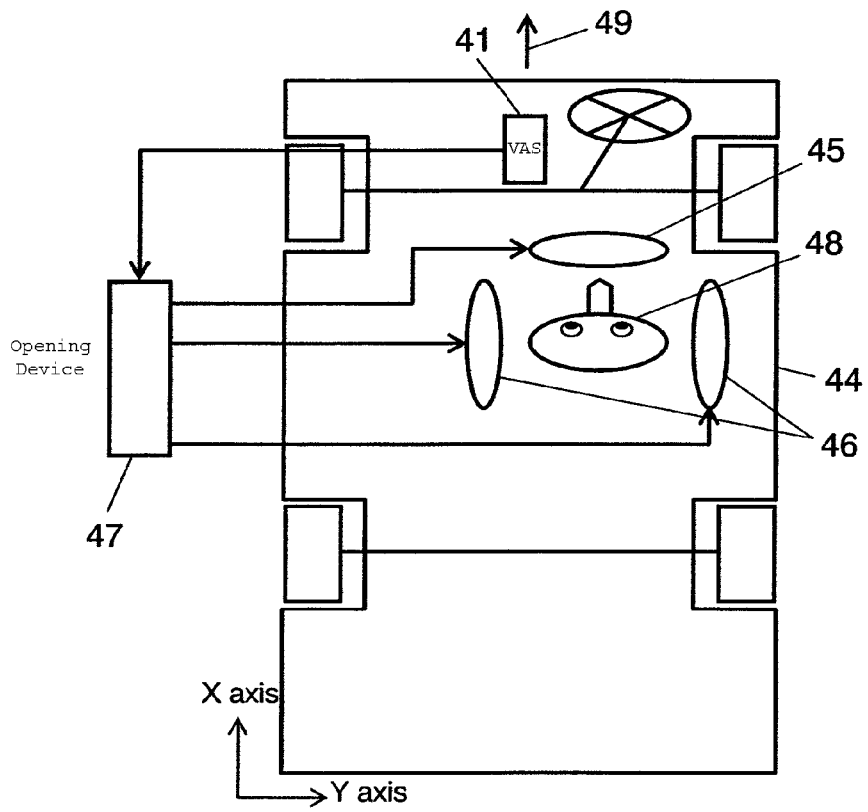
FIG. 6 is a drawing showing a constitution of a control system of an airbag using a VAS in accordance with a second embodiment of the present invention.
Figure 7:
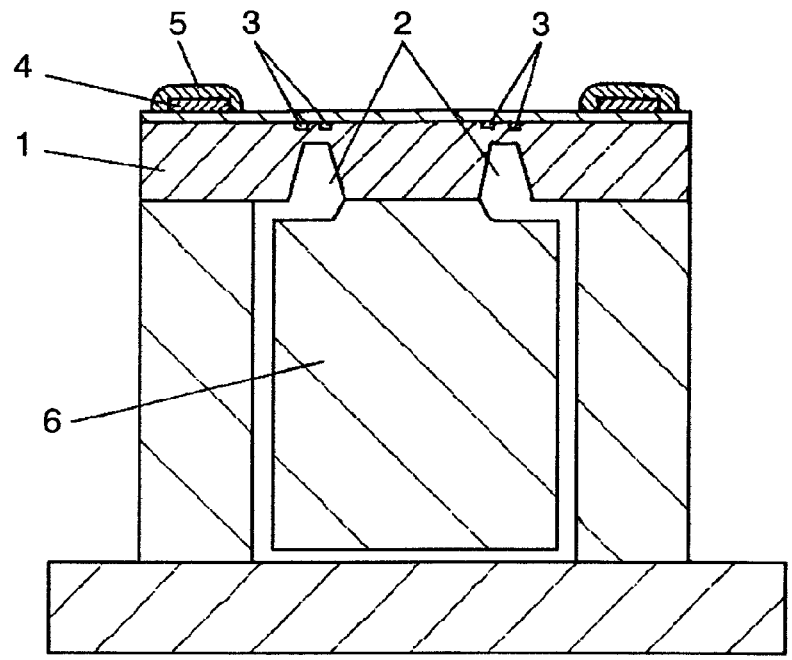
FIG. 7 is a sectional view showing a constitution of a conventional acceleration sensor.
Figure 8:
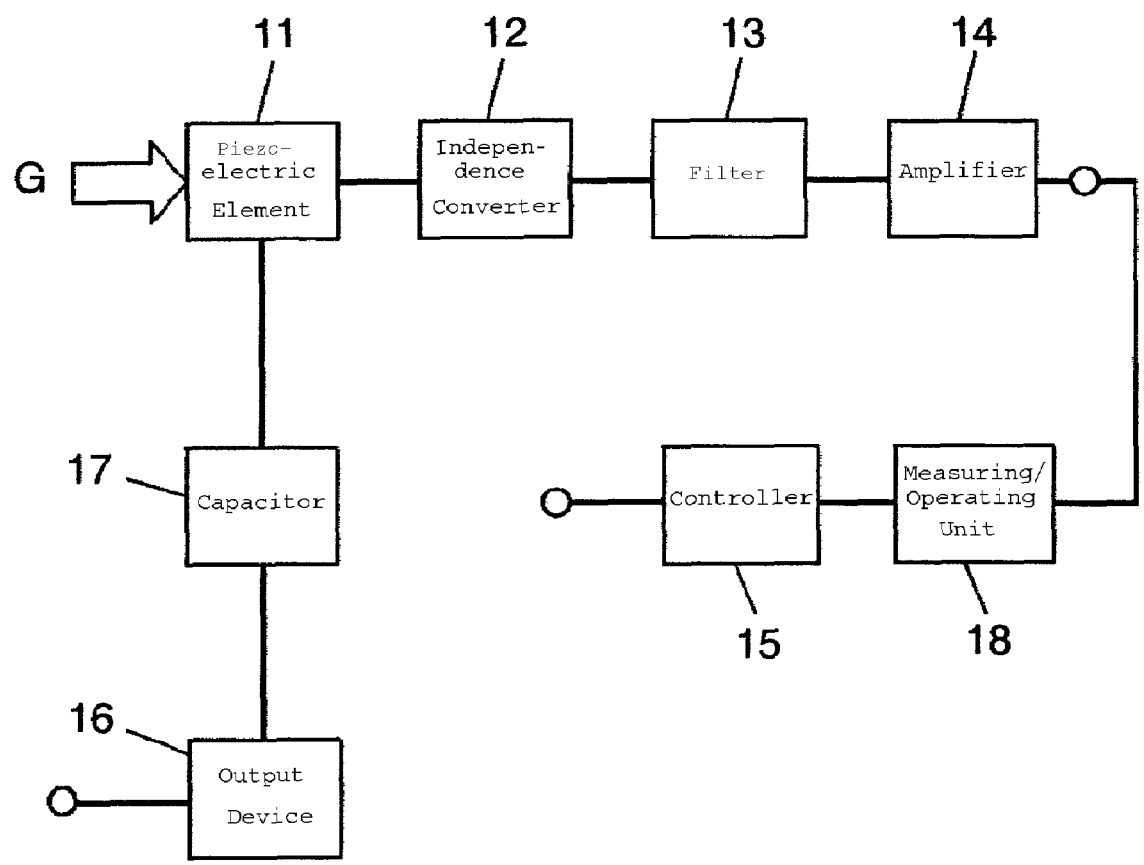
FIG. 8 is a block diagram showing a constitution of another conventional acceleration sensor.

FIG. 6 shows an airbag control system, an application example of VAS 41 of the invention. VAS 41 is installed in the X-axis and the Y-axis directions. The control system is explained with reference to vehicle body 44, front airbag 45, side airbag 46, opening device 47 and driver 48. Arrow mark 49 indicates a moving direction of the vehicle.

Thus installed, VAS 41 of the present invention controls work in vehicle 44 by controlling acceleration. When an acceleration value exceeds a certain level, the sensor sends out an acceleration output signal to airbag opening device 47 for opening the airbag. The opening signal is then transmitted to airbags 45 and 46 opening the airbag, thus realizing safe driving with the sensor.

If acceleration is generated by a collision in the moving direction (X-axis direction), front airbag 45 is opened, and if acceleration is generated in a side direction (Y-axis direction), the acceleration signal in right and left directions opens side airbags 46, thus a fatal human accident is prevented. Since 2 axes acceleration detection is done for both the front airbag and the side airbag, a high level of safety control is ensured.

In VAS 41, in accordance with the exemplary embodiment, vibration piezoelectric sensor 41 senses acceleration applied to vehicle 44 somewhat differently depending on a position where the sensor is placed, therefore vibration piezoelectric acceleration sensor 41 is preferably disposed in a central part of the vehicle 44 for detecting an average acceleration. Accordingly, in this exemplary embodiment, VAS 41 is placed in a central part of the vehicle. Positional relationship between a driver and an airbag in a vehicle is not limited to one arranged in this exemplary embodiment. Even if the driver is sitting in the left side of the vehicle with regard to the moving direction, an identical effect is provided.

INDUSTRIAL APPLICABILITY

The VAS according to the present invention detects a high change ratio of resonance frequency caused by acceleration, and the acceleration can be detected highly accurately with two detections without being affected by a change in temperature. Accordingly, the sensor can be used for an airbag control system, as well as for a sensor detecting gravity as a static acceleration. The static acceleration detecting capability can be utilized for a sensor detecting an angle of inclination, and the angle of inclination detection capability can be utilized for a navigator navigating a three dimensional position including an altitude.

The invention claimed is:

1. A vibration piezoelectric acceleration sensor comprising:
   a frame;
   a first pair of beam shaped members linearly and oppositely disposed on the frame, each beam shaped member including:
      an under part electrode;
      a piezoelectric thin film; and
      an upper part electrode;
   a support body supporting each of the first pair of beam shaped members, the support body being adjacent to one end of each beam shaped member; and
   a holding part holding the support body in a linear direction,
   wherein the first pair of beam shaped members is extended and retracted by an acceleration transmitted to the support body through the holding part, wherein the acceleration is detected through a change in a natural oscillation frequency of the first pair of beam shaped members, and
   wherein the holding part is constructed and arranged in a meandering manner.

2. A vibration piezoelectric acceleration sensor as defined in claim 1, wherein the first pair of beam shaped members are linearly and oppositely disposed and define a first line that crosses a second line defined by a second pair of beam shaped members that are linearly and oppositely disposed on the frame, the first and second pair of beam shaped members configured to detect acceleration in the direction of two axes.

3. A vibration piezoelectric acceleration sensor as defined in claim 1, wherein the first pair of beam shaped members are configured to extend and retract, such that a difference in the natural oscillation frequency therebetween determines an acceleration signal.

4. A vibration piezoelectric acceleration sensor as defined in claim 1, wherein each of the first pair of beam shaped members, the support body and the holding part are formed from silicon.

5. A vibration piezoelectric acceleration sensor as defined in claim 1, wherein the piezoelectric thin film is made of PZT.

6. A vibration piezoelectric acceleration sensor as defined in claim 1, wherein each of the first pair of the beam shaped members has one end attached to the frame and one other end attached to the support body.

7. A vibration piezoelectric acceleration sensor as defined in claim 1, wherein the upper part electrode formed on each of the first pair of beam shaped members is extendedly formed along a center part of a respective beam shaped member.

8. A vibration piezoelectric acceleration sensor as defined in claim 1, wherein mass is added to the support body supporting each of the first pair of beam shaped members.

9. A vibration piezoelectric acceleration sensor as defined in claim 1, wherein a detecting electrode and a driving electrode form the upper part electrode, the detecting electrode and the driving electrode being disposed symmetrically with respect to a central axis crossing a longitudinal direction of each of the first pair of beam shaped members equally dividing each beam shaped member.

10. A vibration piezoelectric acceleration sensor as defined in claim 1, wherein the frame is configured to be attached to a main body, so that static acceleration and dynamic acceleration can be detected.

11. A vibration piezoelectric acceleration sensor including an element comprising:
   a frame;
   a first pair of beam shaped members linearly and oppositely disposed on the frame;
   a second pair of beam shaped members linearly and oppositely disposed on the frame, said first pair of beam shaped members being disposed linearly on a first line that crosses a second line on which the second pair of beam shaped members are disposed, each beam shaped member including:
      an under part electrode;
      a piezoelectric thin film; and
      an upper part electrode;
   a support body supporting each of the beam shaped members, the support body being adjacent to one end of each beam shaped member; and
   a holding part holding the support body in a linear direction, the holding part being located between one of the first pair of beam shaped members and one of the second pair of beam shaped members,
   wherein each beam shaped member is extended and retracted by an acceleration transmitted to the support body through the holding part, and
   wherein the acceleration is detected through a change in a natural oscillation frequency of each beam shaped members,
   wherein the holding part is constructed and arranged in a meandering manner.

12. A vibration piezoelectric acceleration sensor as defined in claim 11, wherein the first pair of beam shaped members and the second pair of beam shaped members are configured to detect acceleration in the direction of two axes.

13. A vibration piezoelectric acceleration sensor as defined in claim 11, wherein the first pair of beam shaped members are configured to extend and retract, such that a difference in the natural oscillation frequency therebetween determines an acceleration signal.

14. A vibration piezoelectric acceleration sensor as defined in claim 11, wherein each beam shaped member, the support body and the holding part are formed from silicon.

15. A vibration piezoelectric acceleration sensor as defined in claim 11, wherein the piezoelectric thin film is made of PZT.

16. A vibration piezoelectric acceleration sensor as defined in claim 11, wherein each of the beam shaped members has one end attached to the frame and one other end attached to the support body.

17. A vibration piezoelectric acceleration sensor as defined in claim 11, wherein the upper part electrode formed on each beam shaped member is extendedly formed along a center part of a respective beam shaped member.

18. A vibration piezoelectric acceleration sensor as defined in claim 11, wherein mass is added to the support body supporting the beam shaped members.

19. A vibration piezoelectric acceleration sensor as defined in claim 11, wherein a detecting electrode and a driving electrode are disposed as the upper part electrode formed on each beam shaped member, the detecting electrode and the driving electrode being disposed symmetrically with respect to a central axis crossing a longitudinal direction of each beam shaped member equally dividing each beam shaped member.

20. A vibration piezoelectric acceleration sensor as defined in claim 11, wherein the frame is configured to be attached to a main body so that static acceleration and dynamic acceleration can be detected.

* * * * *